INVENTOR.
THOMAS E. McCAY
BY Lyon & Lyon
ATTORNEYS

INVENTOR.
THOMAS E. McCAY
BY Lyon & Lyon
ATTORNEYS

United States Patent Office 3,443,035

Patented May 6, 1969

3,443,035

WIRELESS EXTENSION TELEPHONE

Thomas E. McCay, Norman, Okla., assignor, by mesne assignments, to Pioneer Mortgage and Investment Company, Inc., Oklahoma City, Okla., a corporation of Oklahoma Filed May 21, 1965, Ser. No. 457,773
Int. Cl. H04m 5/00; H04b 1/38, 7/00
U.S. Cl. 179—41 4 Claims

ABSTRACT OF THE DISCLOSURE

A wireless extension telephone system having a fixed unit directly connected to the conventional subscriber line and a remote unit operatively associated with the fixed unit by means of radio transmission and reception. The fixed unit includes a radio transmitter operating on the same carrier frequency as the receiver in the remote unit and a radio receiver operating on a second carrier frequency which is the same as the transmitter in the remote unit. Line seizure is accomplished at the fixed unit by sending a radio frequency signal from the remote unit wherein this signal is coded by a tone pulse and wherein the ratio receiver at the fixed unit is provided with a decoding means responsive to the tone pulse for energizing a line seizure relay, the line seizure relay being thereafter maintained in an energized condition by means of presence of carrier; dialing is accomplished by sending a series of coded pulses on the carrier from the remote unit and by means of a second decoding means at the fixed unit which is adapted to perform the normal dialing functions on the line; ringing is accomplished by means of a tone generator at the fixed unit and an alarm relay which is responsive to ringing signals on the line to actuate the tone generator and to superimpose a code on the carrier from the fixed unit, and by means of a decoding means at the remote unit which is adapted to receive this code and actuate an alarm means.

This invention relates to a wireless extension telephone and more particularly relates to a portable telephone handset unit which can be carried throughout a house, place of business, or the like and operated in the conventional manner but which is not dependent upon a conductive connection to the standard subscriber telephone system.

With the increased usage of the telephone in modern day life, it has become commonplace for homes, places of business, clubs and other buildings to be provided with a number of telephone extensions positioned at different locations to add to the convenience of using the telephone. In situation where too many telephones would be required to satisfy all needs for convenience, such as in clubs and restaurants, it is common practice to provide a plurality of jacks at the various locations and one or more telephone handset units that can be carried to the desired location and there plugged into the jack. While the provision of numerous extension telephones or jacks greatly increases convenience, it also results in a substantial duplication of expense.

In most cases, only a single telephone must be used at any one time and could be temporarily carried to the location in the building where use is anticipated if such portability was possible. Moreover, no matter how many telephone extensions are provided, it is almost impossible to provide enough extensions to insure that a party may converse over the telephone from wherever he may be located. For example, a home subscriber may be in the back yard and not wish to have to go to the house to answer the telephone and yet is usually impractical to provide an extension in the back yard. In the case of a place a business such as a restaurant where jacks are commonly used, it is a matter of substantial expense to provide a jack at each table so that convenient telephone service will be available to the patrons.

To overcome these difficulties and increase the convenience of telephone use, it is an object of the present invention to provide an extension telephone which is identical in operation to current telephones but which is linked into a telephone system by a radio link rather than by a conductive link.

It is also an object of the present invention to provide such an extension telephone that may be connected directly to the subscriber line of present day telephone systems and which does not require any alteration in their operation.

It is another object of the present invention to provide such an extension which is responsive to the normal signals transmitted over a telephone system and which itself causes the transmission of similar signals.

These and other objects and advantages of the present invention will become more apparent upon reference to the accompanying description and drawings in which.

Briefly, the present invention utilizes a remote unit that comprises a portable telephone handset unit and includes a transmitter and receiver operating on different carrier frequencies and a fixed or stationary unit which is also provided with a transmitter and receiver and which is connected to the subscriber line of a preexisting telephone system. The transmitter in the remote unit is rendered operative by the picking up of the handset and in response thereto sends out a tone signal which is received by the receiver in the fixed unit and causes the fixed unit to seize the telephone line. Operation of the dial on the remote unit causes a series of tone pulses to be transmitted, these pulses being received at the fixed unit and converted into conventional dialing impulses on the telephone line. The seizure of the telephone line also causes the transmitter in the fixed unit to be energized so that two-way conversation can take place as soon as the subscriber who has been called has picked up his telephone.

When another subscriber on the telephone system calls the subscriber having the present system, the ringing signal on the telephone line is detected by the fixed unit and results in the fixed unit transmitter being energized and a series of tone pulses being transmitted which correspond to the ringing impulses received. These tone pulses are received by the remote unit where they cause a conventional alarm or bell to ring. When the subscriber picks up his handset, the remote unit transmitter is energized and the conventional two way conversation may take place.

Figure 1:
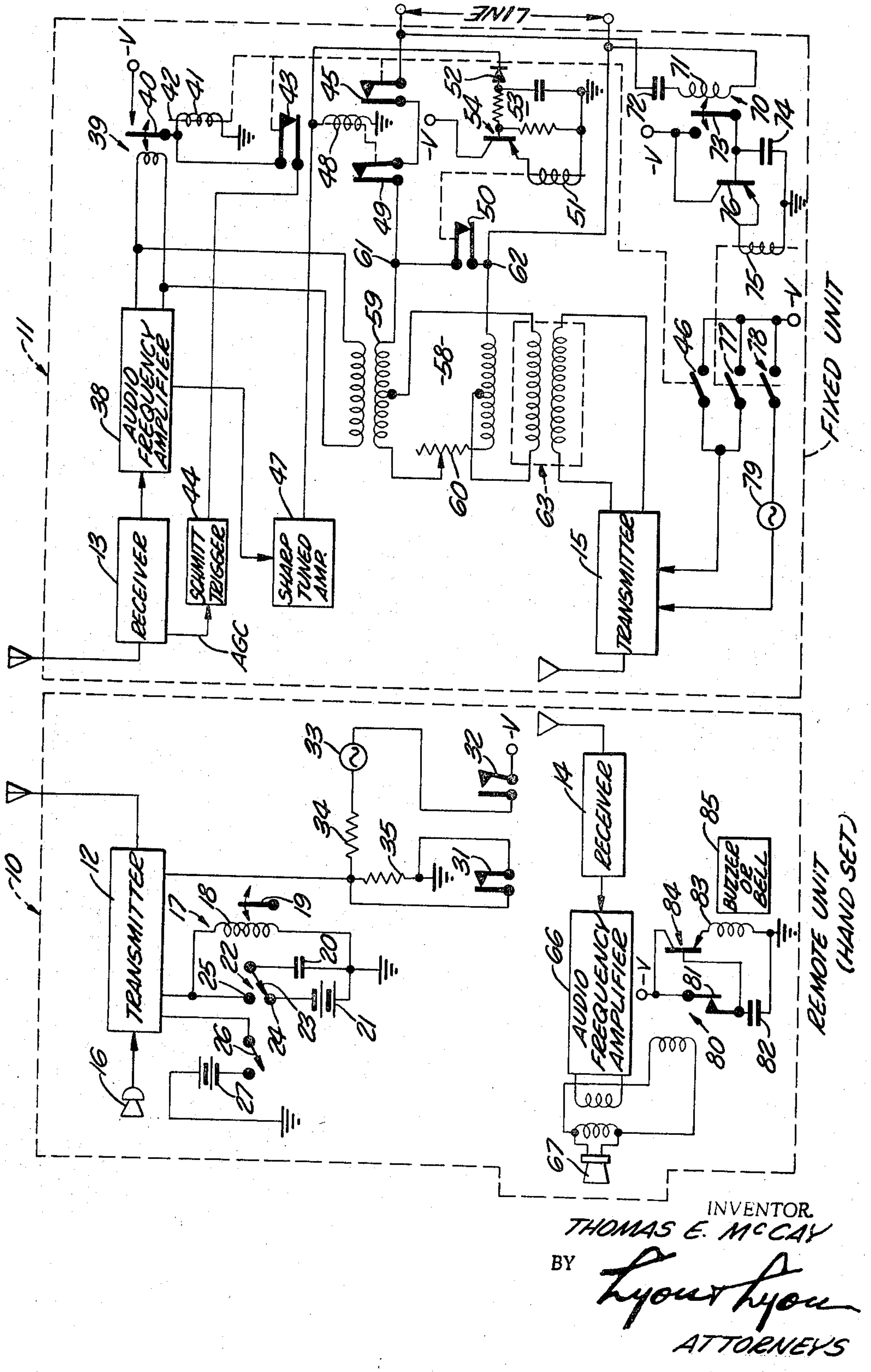
FIGURE 1 is a schematic diagram of the wireless extension telephone system of the present invention.

Turning now to FIGURE 1, the details of the overall system are shown. A remote unit 10 which includes a telephone handset is linked to a fixed unit 11 by means of a transmitter 12 which operates on the same carrier frequency as a superheterodyne receiver 13 in the fixed unit and a superheterodyne receiver 14 which operates on the same carrier frequency as a transmitter 15 in the fixed unit. The output of the transmitter 12 is modulated by the electrical signal produced by the microphone 16 of the handset in response to an audible input. The output of the transmitter 12 may also be modulated by a conventional reed encoder indicated generally at 17. The encoder 17 comprises a coil 18, a vibrating reed 19, a capacitor 20, a battery 21 and a single pole-double throw switch 22. In the deactivated condition, movable contact 23 of switch 22 engages a fixed contact 24 with the result that the capacitor is connected across the battery 21 and charges up to essentially the battery potential. When movable contact 23 is caused to engage the contact 25, the capacitor 20 is connected across the coil 18 causing the reed 19 to vibrate at its resonant frequency. This causes a voltage at that frequency to be developed across the coil 18. It is this voltage that modulates the output of the transmitter 12.

The movable contact 23 of switch 22 is caused to be moved from fixed contact 24 to fixed contact 25 by lifting the handset off the base of the remote unit. Lifting of the handset also causes a switch 26 to close with the result that a battery or other power supply 27 is connected to the transmitter 12 and supplies power thereto with the result that the transmitter 12 is energized.

The output of the transmitter 12 can also be modulated by the operation of the dial on the remote unit. As in the conventional telephone, the dial operates normally closed dial pulse contacts 31 and normally open shunt contacts 32. The shunt contacts 32, when closed, serve to supply energizing power to a tone generator 33 which may comprise any conventional oscillator. The output of the tone generator 33 is connected through a resistor 34 and the dial pulse contacts 31 to ground. The junction of the resistor 34 and the dial contacts 31 is also coupled through a resistor 35 to ground and to the transmitter 12.

As in the conventional telephone, the movement of the dial off normal causes the shunt contacts 32 to be closed and the tone generator 33 to be energized. However, when the dial pulse contacts 31 are closed, the output of the tone generator 33 is connected to ground and the output of the transmitter 12 is not modulated. Each time the contacts 31 open, however, as they do a number of times corresponding to the digit dialed, the output of the tone generator 33 is no longer coupled to ground but rather developes a signal across the resistor 35. This signal acts to modulate the output of the transmitter 12 so that a number of tone pulses corresponding to the digit dialed are transmitted by the transmitter 12.

In the fixed unit 11, the receiver 13, which is always energized, detects the tone pulse generated by the reed encoder 17 and passes it through an audio frequency amplifier 38 to a reed decoder 39. Vibration of the reed 40 of the reed decoder 39 connects a relay coil 41 to a source of potential whereupon the coil is energized. Energization of the relay coil 41 causes its armature 42 to be actuated and perform several operations. First, it closes the normaly open contacts 43 which connects the coil 41 to the output of a Schmitt trigger circuit 44 which in turn is connected to the AGC line of the receiver 13. A holding circuit for the coil 41 is thus established and this coil is held energized so long as a carrier signal is being transmitted by the transmitter 12 and received by the receiver 13.

Actuation of the armature 42 also causes the normally open line contacts 45 to be closed with the result that the telephone line is seized in the conventional manner. Actuation of the armature 42 also causes the closing of a switch 46 which serves to connect the transmitter 15 to a source of potential with the result that the transmitter 15 is energized.

As a digit is dialed at the remote unit, the receiver 13 receives the dial tone pulses and passes them to the audio frequency amplifier 38. One output of the amplifier 38 is connected to a sharp tuned amplifier 47 which is tuned to the frequency of the dialing pulses. The output of the tuned amplifier 47 is coupled to ground through a relay coil 48, energization of which causes the opening of normally closed dial contacts 49 which are connected in series in the telephone line in the conventional manner. In the conventional telephone system, the line is short circuited by shunt contacts which are closed during the dialing operation and prevent the occurrence of large transients. In the present system shunt contacts 50 are provided for this purpose and are actuated by a relay coil 51. The coil 51 is energized through a diode 52, integrating circuit 53 and emitter follower transistor 54. The time constant of the integrating circuit 53 is such that the coil 51 will remain energized and the contacts 50 remain closed during the periods between dialing pulses. Once dialing has ceased, however, the relay coil 51 will be deenergized and the contacts 50 will open thereby removing the short circuit from the telephone line.

The telephone line terminates in a conventional hybrid transformer 58. Audio signals from the amplifier 38 enter the hybrid at winding 59. If the resistor 60 is adjusted to match the apparent impedance across the terminal 61 and 62, audio from the amplifier 38 is cancelled at the primary winding of the transformer 63 but is present across terminal 61 and 62 and on the line. Incoming audio from the line appears at the primary of the transformer 63 and modulates the output of the transmitter 15. The output of the transmitter 15 is received by the receiver 14 in the remote unit. The output of the receiver 14 is passed through an audio frequency amplifier 66 to the earpiece 67 of the telephone handset. Thus, a two-way conversation can be conducted in the normal manner.

When a call is placed by another subscriber to the present unit, a ringing signal, generally at 20 cycles per second, will appear on the line. This ringing signal is detected by a relay 70, the coil 71 of which is connected in series with a blocking capacitor 72 across the line. The coil 71 will sense the ringing current and cause the armature 73 to vibrate thereby periodically connecting a source of potential to a capacitor 74 causing the capacitor to charge. The charge on the capacitor 74 causes a relay coil 75 to be energized through an emitter follower transistor 76.

Energization of the coil 75 causes switches 77 and 78 to be closed. The switch 77 connects the transmitter 15 to a source of potential thereby energizing the transmitter. The switch 78 connects the source of potential to a tone generator 79 which may be any conventional type of oscillator thereby energizing the tone generator 79. Energization of the tone generator 79 causes the output of the transmitter 15 to be modulated in accordance with the output of the generator 79. It can thus be seen that pulses corresponding to the ringing current in the line will be transmitted by the transmitter 15 and received by the receiver 14 and passed to the audio frequency amplifier 66 in the remote unit.

A resonant reed relay 80 is connected across the voice coil and causes the reed 81 to vibrate at its resonant frequency and periodically connect a source of potential to a capacitor 82. The capacitor 82 is thus charged and energizes a relay coil 83 through an emitter follower transistor 84. The relay coil 83 controls a conventional buzzer or bell 85. Since the energization of the coil 75 is dependent upon the duration of the ringing signal on the telephone line, the coil 83 is energized for a like time and the buzzer or bell 85 is sounded for identically the same period of time as would be the case in a conventional telephone.

When the party being called picks up the handset of the remote unit in response to the ringing of the bell, the transmitter 12 is energized as heretofore explained, the coil 41 in the fixed unit is energized and the line seized by operation of the contacts 45. As a result of the operation of the conventional equipment of a telephone exchange, the ringing signal ceases once the line is seized. The energization of the relay coil 41 has, however, caused the switch 46 to close so that the transmitter 15 is energized even after the switch 77 is opened as a result of the disappearance of the ringing signal.

Figure 2:
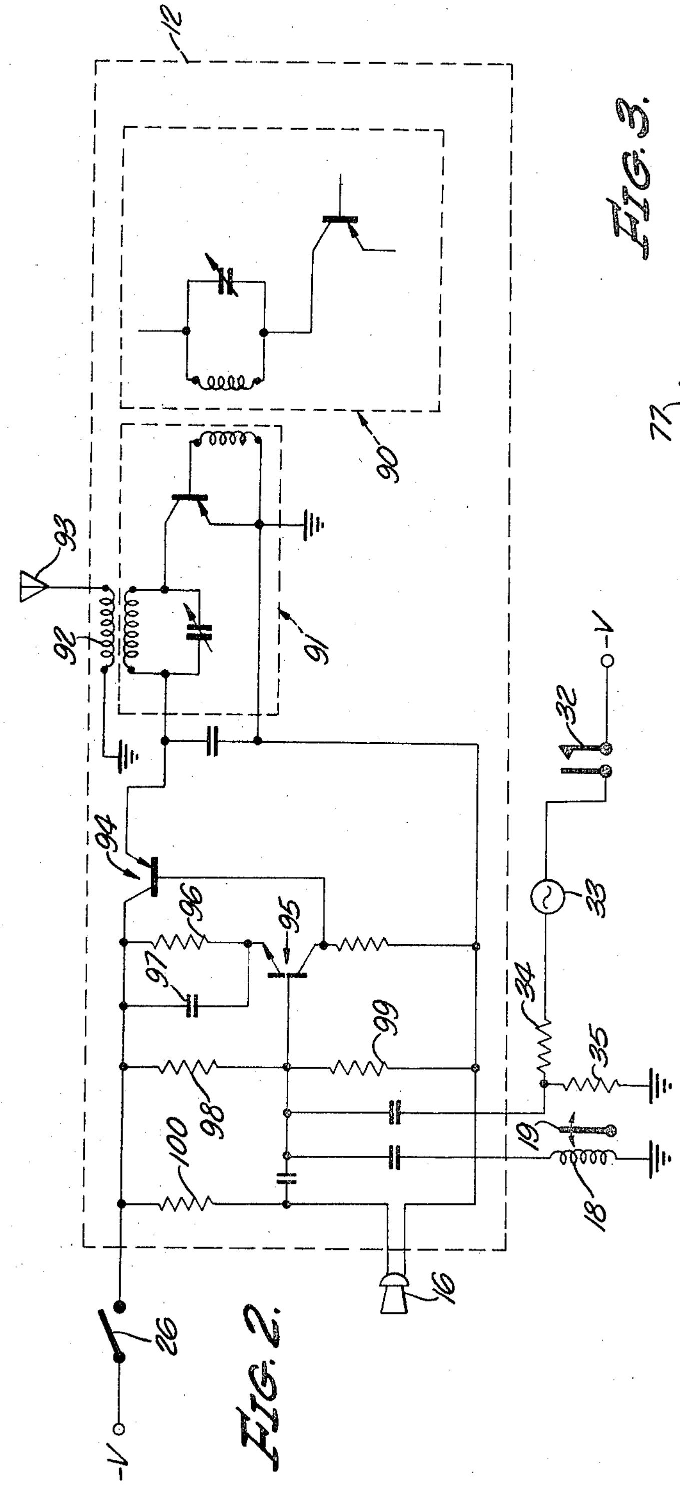
FIGURE 2 is a schematic diagram of the transmitter modulation system used in the remote unit of FIGURE 1.

Turning now to FIGURE 2, there is shown the circuitry by which the transmitter 12 is modulated. An oscillator 90 of any conventional type oscillating at the carrier frequency feeds a class C radio frequency amplifier 91 causing a radio frequency signal to be induced in the coil 92 and transmitted by the antenna 93. In order to obtain 100% amplitude modulation, it is desired to make the quiescent point of the amplifier 91 the midpoint of the swing, that is, to make the amplifier 91 see V/2 as its supply voltage at the quiescent point.

This is accomplished by coupling the amplifier 91 to a source of negative potential through an emitter follower transistor 94. The base of the transistor 94 is DC coupled to the collector of a transistor 95. The emitter resistor 96 of the transistor 95 is bypassed by capacitor 97 to provide the transistor with maximum gain. Bias resistors 98 and 99 are chosen to bias transistor 95 such that its collector is held at the midpoint of its voltage swing, for example, if the swing is from 0 to 10 volts, the collector would be held at 5 volts. Since the transistor 94 is connected as an emitter follower, its emitter voltage follows its base voltage and the amplifier 91 sees as its supply the collector voltage of the transistor 95, i.e., V/2.

The microphone 16 is connected with a resistor 100 in the base circuit of the transistor 95 such that a change in the resistance of the microphone 16 will cause the base voltage of the transistor 95 to change. This variation is amplified and presented to the base of the transistor 94 and thence to the amplifier 91 causing its output to change accordingly and a modulated signal to be transmitted by the antenna 93. The resonant reed encoder coil 18 and the resistor 35 of the dial tone generator circuit are connected in parallel with the microphone 16 and will similarly effect the modulation of the amplifier 91.

Figure 3:
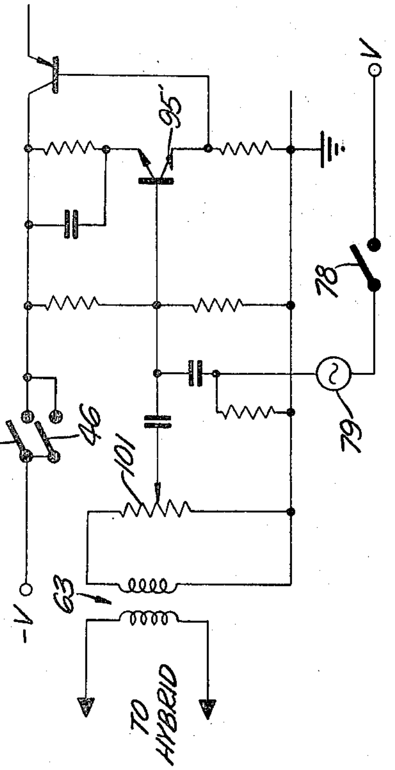
FIGURE 3 is a schematic diagram of the transmitter modulation system used in the fixed unit of FIGURE 1.

Turning now to FIGURE 3, a circuit for modulating the output of the transmitter 15 in the fixed unit is illustrated. This circuit is similar to that shown in FIGURE 2, the only difference being that the voltage at the base of the transistor 95' is controlled by the voltage appearing across a potentiometer 101 connected across the secondary of the transformer 63. Since the operation of the circuit shown in FIGURE 3 is in all other respects similar to that shown in FIGURE 2, further explanation is believed unnecessary.

From the foregoing description, it can be seen that a system has been provided that permits the use of an extension telephone without the encumberance of a conductive link to the conventional telephone system. This greatly adds to the convenience of using the extension telephone as it can be carried by the telephone subscriber to any part of his house, office, or other location so that it is immediately available for his use. The present system eliminates the need for the expensive duplication of extension telephones or the cost of installing a system of telephone jacks. The extension telephone system of the present invention is acceptable for use in presently existing telephone systems as it does not require their alteration but rather transmits and is actuated by the identical signals now used. All that is required is that the fixed unit be attached to the telephone line where it enters the building where the system is to be used. The range of the transmitters used can be limited so that no interference with other systems will take place. In addition, units that may operate in close proximity to each other, for example in an apartment building, can be provided with different operating frequencies so that no interference will occur. Since the operation of the system appears identical to that of conventional telephones, no problems are presented to the use of the system by the general subscriber.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A wireless extension telephone system for connection to a subscriber line of a conventional dial telephone system comprising: a fixed unit including a first radio transmitter and a first radio receiver, a first audio frequency amplifier coupled to the output of said first receiver, means for modulating the output of said first transmitter, a line-seizure relay, decoding means coupled to the output of said first audio frequency amplifier and responsive to a preselected tone pulse to energize said line-seizure relay so as to seize said line, holding circuit means coupled to said first receiver and responsive to the receipt of a carrier signal thereby to maintain said line-seizure relay in energized condition after line seizure and after the cessation of said tone pulse, means operable upon seizure of said line to energize said first transmitter, a remote unit including a telephone handset, a second radio transmitter and a second radio receiver, said second transmitter and said first receiver operating on a first carrier frequency and said second receiver and said first transmitter operating on a second carrier frequency, first switch means responsive to the lifting of said telephone handset for energizing said second transmitter, encoding means for producing said preselected tone pulse, second modulating means for modulating the output of said second transmitter, second switch means responsive to the lifting of said telephone handset for coupling said encoding means to said second modulating means, means coupling the mouthpiece of said telephone handset to said second modulating means, and means coupling the earpiece of said handset to the output of said second receiver.

2. A wireless extension telephone system for connection to a subscriber line of a conventional dial telephone system comprising: a fixed unit including a first radio transmitter and a first radio receiver, a first audio frequency amplifier coupled to the output of said first receiver, first modulating means for modulating the output of said first transmitter, a line-seizure relay, first decoding means coupled to the output of said first audio frequency amplifier and responsive to a preselected tone pulse to energize said line-seizure relay so as to seize said line, holding circuit means coupled to said first receiver and responsive to the receipt of a carrier signal thereby to maintain said line-seizure relay in energized condition after line seizure and after the cessation of said tone pulse, second decoding means coupled to the output of said first audio frequency amplifier and responsive to a series of coded pulses for performing the dialing function on said line, means operable upon seizure of said line to energize said first transmitter, a remote unit including a telephone handset, dialing means, a second radio transmitter and a second radio receiver, said second transmitter and said first receiver operating on a first carrier frequency and said second receiver and said first transmitter operating on a second carrier frequency, first switch means responsive to the lifting of said telephone handset for energizing said second transmitter, encoding means for producing said preselected tone pulse, second modulating means for modulating the output of said second transmitter, second switch means responsive to the lifting of said telephone handset for coupling said encoding means to said second modulating means, tone generator means coupled to said second modulating means, said tone generator means being responsive to operation of said dialing means to produce said series of coded pulses, means coupling the mouthpiece of said telephone handset to said second modulating means, and means coupling the earpiece of said handset to the output of said second receiver.

3. A wireless extension telephone system for connection to a subscriber line of a conventional dial telephone system comprising: a fixed unit including a first radio transmitter and a first radio receiver, a first audio frequency amplifier coupled to the output of said first receiver, first modulating means for modulating the output of said first transmitter, a line-seizure relay, first decoding means coupled to the ouput of said first audio frequency amplifier and responsive to a preselected tone pulse to energize said line-seizure relay so as to seize said line, holding circuit means coupled to said first receiver and responsive to the receipt of a carrier signal thereby to maintain said line-seizure relay in energized condition after line seizure and after the cessation of said tone pulse, an alarm relay, second decoding means coupled to said line and responsive to a ringing signal thereon for energizing said alarm relay, a source of power, first switch means closeable in response to energization of said alarm relay for coupling said first transmitter to said source of power whereby said first transmitter is energized, a tone generator coupled to said first modulating means, second switch means closeable in response to energization of said alarm relay for coupling said tone generator to said source of power whereby said tone generator is energized, and third switch means operable upon seizure of said line to couple said first transmitter to said source of power, a remote unit including a telephone handset, a second radio transmitter and a second radio receiver, said second transmitter and said first receiver operating on a first carrier fequency and said second receiver and said first transmitter operating on a second carrier frequency, a second audio frequency amplifier coupled to the output of said second receiver, means coupling the earpiece of said handset to the output of said second audio frequency amplifier, alarm means, third decoding means coupled to the output of said second audio frequency amplifier and responsive to tone pulses transmitted by said first transmitter in response to the energization of said tone generator to operate said alarm means, fourth switch means responsive to the lifting of said telephone handset for energizing said second transmitter, encoding means for producing said preselected tone pulse, second modulating means for modulating the output of said second transmitter, fifth switch means responsive to the lifting of said telephone handset for coupling said encoding means to said second modulating means, and means coupling the mouthpiece of said telephone handset to said second modulating means.

4. A wireless extension telephone system for connection to a subscriber line of a conventional dial telephone system comprising: a fixed unit including a first radio transmitter and a first radio receiver, a first audio frequency amplifier coupled to the output of said first receiver, first modulating means for modulating the output of said first transmitter, a line-seizure relay, first decoding means coupled to the output of said first audio frequency amplifier and responsive to a preselected tone pulse to energize said line-seizure relay so as to seize said line, holding circuit means coupled to said first receiver and responsive to the receipt of a carrier signal thereby to maintain said line-seizure relay in energized condition after line seizure and after the cessation of said tone pulse, second decoding means coupled to the output of said first audio frequency amplifier and responsive to a series of coded pulses for performing the dialing functions on said line, an alarm relay, third decoding means coupled to said line and responsive to a ringing signal thereon for energizing said alarm relay, a source of power, first switch means closeable in response to energization of said alarm relay for coupling said first transmitter to said source of power whereby said first transmitter is energized, first tone generator means coupled to said first modulating means, second switch means closeable in response to energization of said alarm relay for coupling said first tone generator means to said source of power whereby said first tone generator means is energized, and third switch means operable upon seizure of said line to couple said first transmitter to said source of power, a remote unit including a telephone handset, dialing means, a second radio transmitter and a second radio receiver, said second transmitter and said first receiver operating on a first carrier frequency and said second receiver and said first transmitter operating on a second carrier frequency, fourth switch means responsive to the lifting of said telephone handset for energizing said second transmitter, encoding means for producing said preselected tone pulse, second modulating means for modulating the output of said second transmitter, fifth switch means responsive to the lifting of said telephone handset for coupling said encoding means to said second modulating means, second tone generator means coupled to said second modulating means, said second tone generator means being responsive to operation of said dialing means to produce said series of coded pulses, means coupling the mouthpiece of said telephone handset to said second modulating means, a second audio frequency amplifier coupled to the output of said second receiver, means coupling the earpiece of said handset to the output of said second audio frequency amplifier, alarm means, and fourth decoding means coupled to the output of said second audio frequency amplifier and responsive to tone pulses transmitted by said first transmitter in response to the energization of said first tone generator means to operate said alarm means.

References Cited

UNITED STATES PATENTS

| | | | |
|---|---|---|---|
| 2,894,121 | 7/1959 | Phillips. | |
| 2,980,794 | 4/1961 | Hargreaves et al. | |
| 3,193,623 | 7/1965 | Burns et al.. | |
| 3,339,141 | 8/1967 | Rothenbuhler et al. | |
| 3,366,880 | 1/1968 | Driver. | |
| 3,124,657 | 3/1964 | Peterson. | |
| 3,132,300 | 5/1964 | Lefevre | 325—105 |
| 3,198,888 | 8/1965 | Lemelson. | |

KATHLEEN H. CLAFFY, *Primary Examiner.*

ALBIN H. GESS, *Assistant Examiner.*

U.S. Cl. X.R.

325—64, 55, 16